United States Patent
Weyerhaeuser et al.

(10) Patent No.: US 9,489,398 B2
(45) Date of Patent: Nov. 8, 2016

(54) COLUMNWISE RANGE K-NEAREST NEIGHBORS SEARCH QUERIES

(75) Inventors: Christoph Weyerhaeuser, Heidelberg (DE); Tobias Mindnich, Walldorf (DE); Daniel Baeumges, Viersen (DE); Gerrit Simon Kazmaier, Heidelberg (DE)

(73) Assignee: SAP SE, Walldorf (DE)

( * ) Notice: Subject to any disclaimer, the term of this patent is extended or adjusted under 35 U.S.C. 154(b) by 450 days.

(21) Appl. No.: 13/532,640

(22) Filed: Jun. 25, 2012

(65) Prior Publication Data

US 2013/0346392 A1 Dec. 26, 2013

(51) Int. Cl.
*G06F 7/00* (2006.01)
*G06F 17/30* (2006.01)

(52) U.S. Cl.
CPC ..... *G06F 17/30241* (2013.01); *G06F 17/3053* (2013.01); *G06F 17/30598* (2013.01)

(58) Field of Classification Search
None
See application file for complete search history.

(56) References Cited

U.S. PATENT DOCUMENTS

| | | | | |
|---|---|---|---|---|
| 5,974,419 A | * | 10/1999 | Ashby | G01C 21/26 340/990 |
| 2002/0005862 A1 | * | 1/2002 | Deering | G06F 3/011 345/694 |
| 2003/0033273 A1 | * | 2/2003 | Wyse | 707/1 |
| 2003/0212689 A1 | * | 11/2003 | Chen | G06F 17/30333 |
| 2006/0265422 A1 | * | 11/2006 | Ando | G06F 17/30241 |
| 2006/0287984 A1 | * | 12/2006 | Chen | G06F 17/30463 |
| 2007/0192301 A1 | * | 8/2007 | Posner | G06F 17/30327 |
| 2007/0288196 A1 | * | 12/2007 | Frank | G01C 21/20 702/151 |
| 2009/0070293 A1 | | 3/2009 | Vechersky | |
| 2011/0320319 A1 | * | 12/2011 | Streich | G06Q 30/06 705/27.1 |

OTHER PUBLICATIONS

"Web data retrieval: solving spatial range queries using k-nearest neighbor searches", by Wan D. Bae et al., Oct. 24, 2007, © Springer Science + Business Media, LLC 2008.*

* cited by examiner

*Primary Examiner* — Jay Morrison
*Assistant Examiner* — Hasanul Mobin
(74) *Attorney, Agent, or Firm* — Mintz Levin Cohn Ferris Glovsky and Popeo, P.C.

(57) ABSTRACT

A range k-nearest neighbor search query of a database is processed by first defining an inner rectangle bounded within a circle around a center point specified by the range k-nearest neighbor search query. Thereafter, a distance to the center point is calculated for each point within the inner rectangle. Query results are returned if k or more points are within the inner rectangle. Otherwise, at least one additional query is executed. Related apparatus, systems, techniques and articles are also described.

19 Claims, 5 Drawing Sheets

COLUMNWISE RANGE K-NEAREST NEIGHBORS SEARCH QUERIES

TECHNICAL FIELD

The current subject matter is directed to range k-nearest neighbor searching of point data stored columnwise storage in a data source such as a column oriented database.

BACKGROUND

Geographic information systems (GIS), sometimes referred to as spatial information systems (SIS), are specialized information systems to capture, modeling, storage, retrieval, sharing, manipulation, analysis and presentation of spatial data. The main entities are spatial objects. The spatial component may embody both geometry (location, shape etc.) and topology (spatial relationships such as adjacency). The special traits of a geometric object differs significantly from any standard type, such as integers and strings.

For a range k-nearest neighbor query a center point (C), consisting of the X ($C_X$) and Y ($C_Y$) coordinate, is provided, the radius (R) is and the number of requested points (K). The result is a list of k or less than k points ordered by the minimal distance to C. For the processing all points have to be considered, and for all points the distance to C has to be calculated. With an increasing number of points the processing consumes more resources (and requires a longer amount of time to complete).

SUMMARY

In one aspect, a range k-nearest neighbor search query of a database is processed by first defining an inner rectangle bounded within a circle around a center point specified by the range k-nearest neighbor search query. Thereafter, a distance to the center point is calculated for each point within the inner rectangle. Query results are returned if k or more points are within the inner rectangle. Otherwise, at least one additional query is executed.

Each point can be sorted according to their calculated distances such that the returned query results are presented according to the sorting.

In those cases in which the inner rectangle includes less than k point, a maximum bounding rectangle can be calculated that includes the circle if there are less than k points in the inner rectangle. A first query can then be executed using the inner rectangle and a bit vector can be generated that indicates indexes of all points in the first query. Thereafter, a second query can be generated and executed using the maximum bounding rectangle and the bit vector. In this case, the bit vector is used to skip those points retrieved by the first query. Subsequently, results are returned based on the first query and the second query.

A value of 1 at an index position in the bit vector can indicate that the corresponding point was retrieved by the first query. The results of the second query can be sorted according to distance from the center point. The returned query results can include only those results from the second query that, in combination with the results from the first query, are equal to or less than k.

In some implementations, results from the second query can be condensed. The results can be condensed by identifying minimal and maximal bounds relative to the center point, generating a second bit vector that identifies points outside the minimal and maximal bounds, and accessing the second bit vector to determine a distance to the center point for only those points within the minimal and maximal bounds.

Non-transitory computer program products are also described that store instructions, which when executed, cause one or more data processors across one or more computing systems to implement various operations described herein. Similarly, computer systems are also described that may include at least one data processor and a memory coupled to the at least one data processor. The memory may temporarily or permanently store one or more programs that cause the at least one data processor to perform one or more of the operations described herein. In addition, operations specified by methods can be implemented by one or more data processors either within a single computing system or distributed among two or more computing systems.

The subject matter described herein provides many advantages. For example, the current subject matter reduces the number of calculated distances by reducing the list of points that has to be considered for a query. In particular, the current subject matter is advantageous in that the amount of points for which the distance to the center point has to be calculated can be reduced. In addition, an optimistic approach can be utilized that starts with a subset of points and that can extend such set of points if less than range k-nearest neighbors are found. Further, the current subject matter takes advantage of columnwise storage of points (one column for X values and one column for Y values of the points) for improved processing times.

The details of one or more variations of the subject matter described herein are set forth in the accompanying drawings and the description below. Other features and advantages of the subject matter described herein will be apparent from the description and drawings, and from the claims.

DETAILED DESCRIPTION

Figure 1:
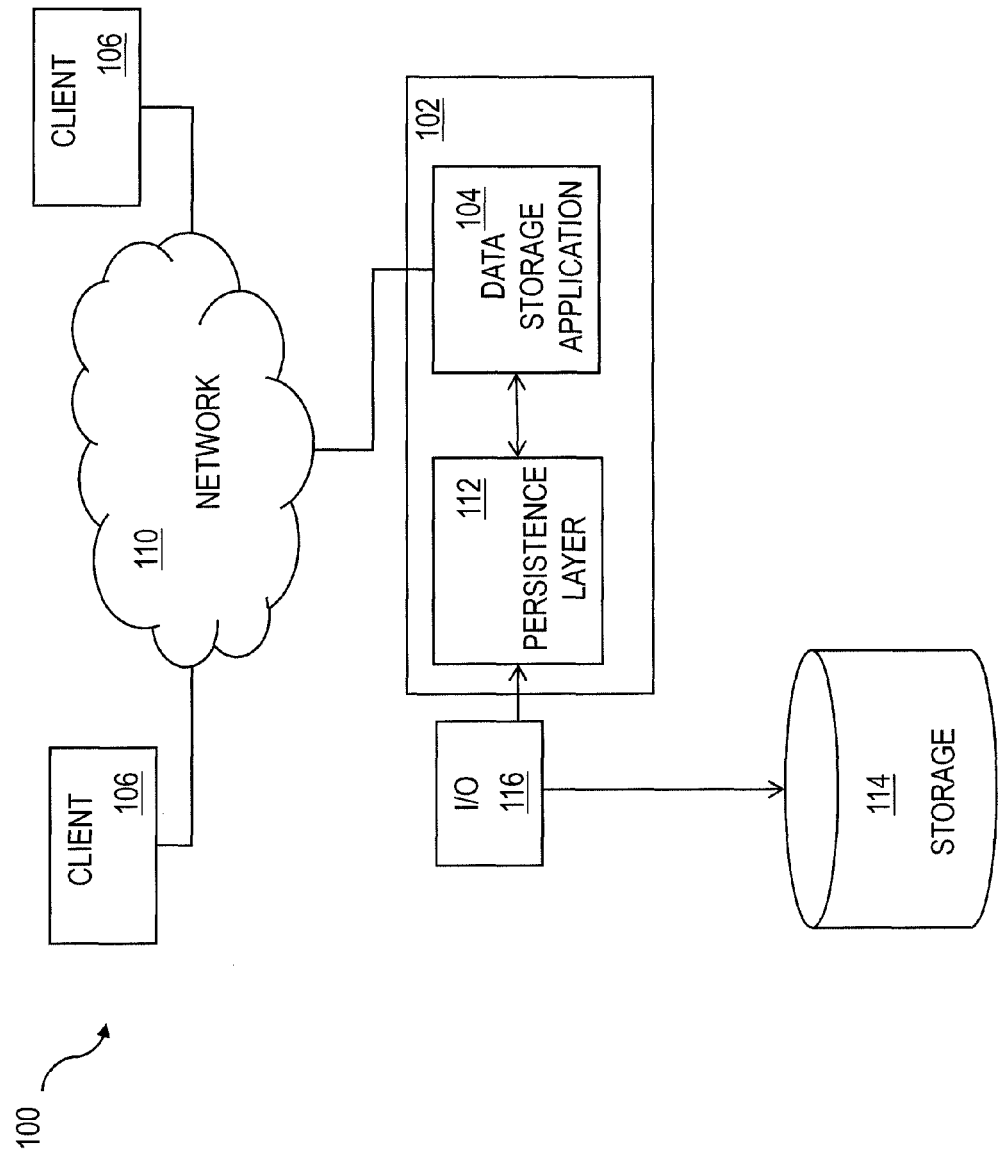
FIG. 1 is a diagram illustrating a system including a data storage application.

FIG. 1 shows an example of a system 100 in which a computing system 102, which can include one or more programmable processors that can be collocated, linked over one or more networks, etc., executes one or more modules, software components, or the like of a data storage application 104. The data storage application 104 can include one or more of a database, an enterprise resource program, a distributed storage system (e.g. NetApp Filer available from NetApp of Sunnyvale, Calif.), or the like.

The one or more modules, software components, or the like can be accessible to local users of the computing system 102 as well as to remote users accessing the computing system 102 from one or more client machines 106 over a network connection 110. One or more user interface screens produced by the one or more first modules can be displayed to a user, either via a local display or via a display associated with one of the client machines 106. Data units of the data storage application 104 can be transiently stored in a persistence layer 112 (e.g. a page buffer or other type of temporary persistency layer), which can write the data, in the form of storage pages, to one or more storages 114, for example via an input/output component 116. The one or more storages 114 can include one or more physical storage media or devices (e.g. hard disk drives, persistent flash memory, random access memory, optical media, magnetic media, and the like) configured for writing data for longer term storage. It should be noted that the storage 114 and the input/output component 116 can be included in the computing system 102 despite their being shown as external to the computing system 102 in FIG. 1.

Data retained at the longer term storage 114 can be organized in pages, each of which has allocated to it a defined amount of storage space. In some implementations, the amount of storage space allocated to each page can be constant and fixed. However, other implementations in which the amount of storage space allocated to each page can vary are also within the scope of the current subject matter.

Figure 2:
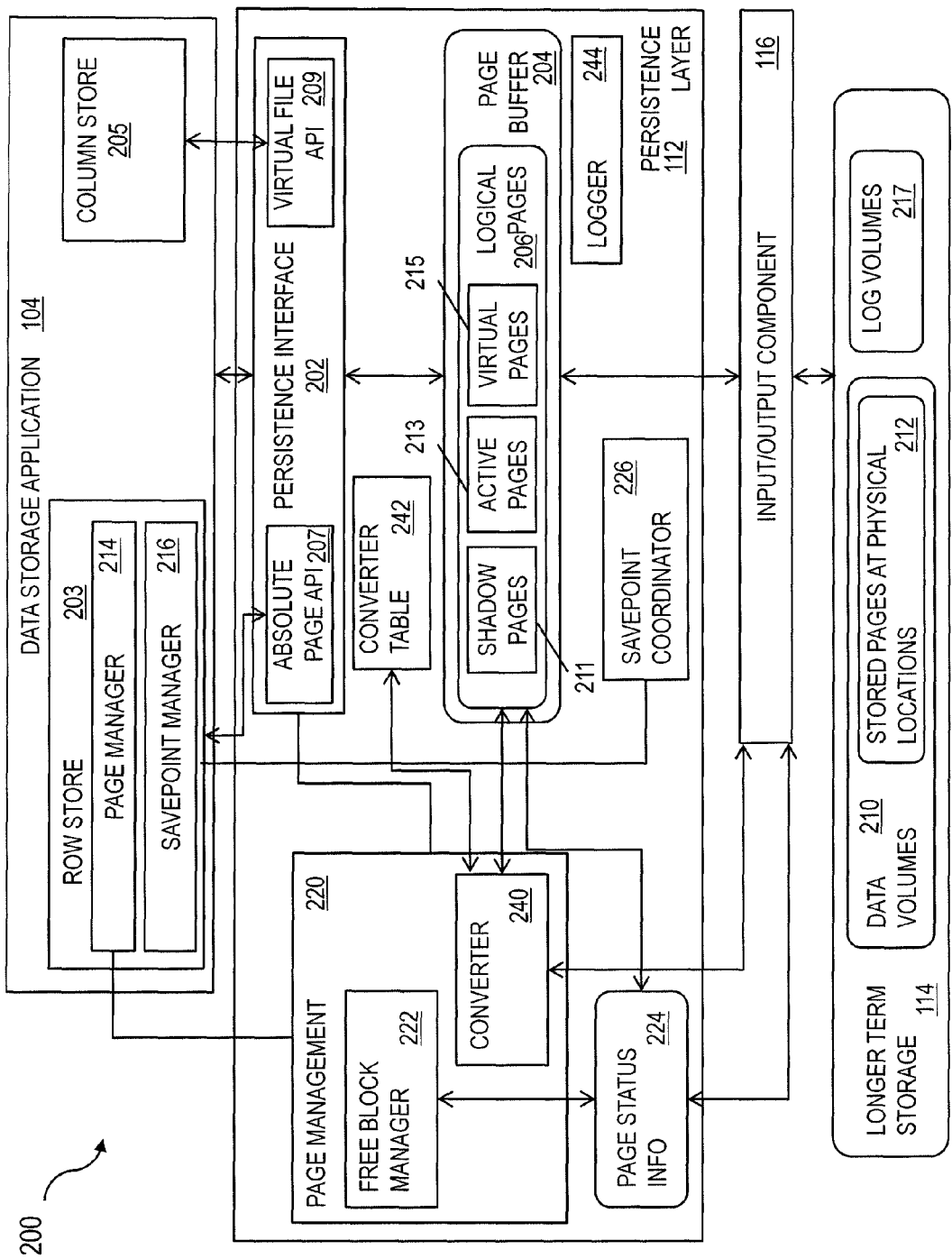
FIG. 2 is a diagram illustrating details of the system of FIG. 1.

FIG. 2 shows a software architecture 200 consistent with one or more features of the current subject matter. A data storage application 104, which can be implemented in one or more of hardware and software, can include one or more of a database application, a network-attached storage system, or the like. According to at least some implementations of the current subject matter, such a data storage application 104 can include or otherwise interface with a persistence layer 112 or other type of memory buffer, for example via a persistence interface 202. A page buffer 204 within the persistence layer 112 can store one or more logical pages 206, and optionally can include shadow pages 211, active pages 213, data pages of virtual files 215 (i.e., a data objects acting like a file) and the like. The logical pages 206 retained in the persistence layer 112 can be written to a storage (e.g. a longer term storage, etc.) 114 via an input/output component 116, which can be a software module, a sub-system implemented in one or more of software and hardware, or the like. The storage 114 can include one or more data volumes 210 where stored pages 212 are allocated at physical memory blocks.

In some implementations, the data storage application 104 can include a row store 203 and a column store 205. The row store 203 can comprise or be otherwise in communication with a page manager 214 and/or a savepoint manager 216. The page manager 214 can communicate with a page management module 220 at the persistence layer 112 that can include a free block manager 222 that monitors page status information 224, for example the status of physical pages within the storage 114 and logical pages in the persistence layer 112 (and optionally in the page buffer 204). The savepoint manager 216 can communicate with a savepoint coordinator 226 at the persistence layer 204 to handle savepoints, which are used to create a consistent persistent state of the database for restart after a possible crash. The row store 203 can access the persistence interface 202 via an absolute page API 207. The column store 205 which can store columns in contiguous memory can access the persistence interface 202 via a virtual file API 209.

In some implementations of a data storage application 104, the page management module of the persistence layer 112 can implement shadow paging. The free block manager 222 within the page management module 220 can maintain the status of physical pages. The page buffer 204 can included a fixed page status buffer that operates as discussed herein. A converter component 240, which can be part of or in communication with the page management module 220, can be responsible for mapping between logical and physical pages written to the storage 114. The converter 240 can maintain the current mapping of logical pages to the corresponding physical pages in a converter table 242. The converter 240 can maintain a current mapping of logical pages 206 to the corresponding physical pages in one or more converter tables 242. When a logical page 206 is read from storage 114, the storage page to be loaded can be looked up from the one or more converter tables 242 using the converter 240. When a logical page is written to storage 114 the first time after a savepoint, a new free physical page is assigned to the logical page. The free block manager 222 marks the new physical page as "used" and the new mapping is stored in the one or more converter tables 242.

The persistence layer 112 can ensure that changes made in the data storage application 104 are durable and that the data storage application 104 can be restored to a most recent committed state after a restart. Writing data to the storage 114 need not be synchronized with the end of the writing transaction. As such, uncommitted changes can be written to disk and committed changes may not yet be written to disk when a writing transaction is finished. After a system crash, changes made by transactions that were not finished can be rolled back. Changes occurring by already committed transactions should not be lost in this process. A logger component 244 can also be included to store the changes made to the data of the data storage application in a linear log. The logger component 244 can be used during recovery to replay operations since a last savepoint to ensure that all operations are applied to the data and that transactions with a logged "commit" record are committed before rolling back still-open transactions at the end of a recovery process.

With some data storage applications, writing data to a disk is not necessarily synchronized with the end of the writing transaction. Situations can occur in which uncommitted changes are written to disk and while, at the same time, committed changes are not yet written to disk when the writing transaction is finished. After a system crash, changes made by transactions that were not finished must be rolled back and changes by committed transaction must not be lost.

To ensure that committed changes are not lost, redo log information can be written by the logger component 244 whenever a change is made. This information can be written to disk at latest when the transaction ends. The log entries can be persisted in separate log volumes 217 while normal data is written to data volumes 210. With a redo log, committed changes can be restored even if the corresponding data pages were not written to disk. For undoing uncommitted changes, the persistence layer 112 can use a combination of undo log entries (from one or more logs) and shadow paging.

The persistence interface 202 can handle read and write requests of stores (e.g., in-memory stores, etc.). The persistence interface 202 can also provide write methods for writing data both with logging and without logging. If the logged write operations are used, the persistence interface 202 invokes the logger 244. In addition, the logger 244 provides an interface that allows stores (e.g., in-memory stores, etc.) to directly add log entries into a log queue. The logger interface also provides methods to request that log entries in the in-memory log queue are flushed to disk.

Log entries contain a log sequence number, the type of the log entry and the identifier of the transaction. Depending on the operation type additional information is logged by the logger 244. For an entry of type "update", for example, this would be the identification of the affected record and the after image of the modified data.

When the data application 104 is restarted, the log entries need to be processed. To speed up this process the redo log is not always processed from the beginning Instead, as stated above, savepoints can be periodically performed that write all changes to disk that were made (e.g., in memory, etc.) since the last savepoint. When starting up the system, only the logs created after the last savepoint need to be processed. After the next backup operation the old log entries before the savepoint position can be removed.

When the logger 244 is invoked for writing log entries, it does not immediately write to disk. Instead it can put the log entries into a log queue in memory. The entries in the log queue can be written to disk at the latest when the corresponding transaction is finished (committed or aborted). To guarantee that the committed changes are not lost, the commit operation is not successfully finished before the corresponding log entries are flushed to disk. Writing log queue entries to disk can also be triggered by other events, for example when log queue pages are full or when a savepoint is performed.

The column store 205 can store its tables to virtual files provided by the persistence layer 112 via the virtual file API 207. Internally the persistence layer 112 can map a virtual file to a chain of linked pages 215 stored in the page buffer 204. Data belonging to one columnar table can be stored in multiple virtual files: one virtual file per column for a main storage and one virtual file for a delta log. In addition, one virtual file can optionally be stored per column for the main storage of the history part of the table, and/or one virtual file can optionally be stored per table for the delta of the history part of the table. The persistence layer 112 can maintain a directory that stores for each virtual file the start page and additional information such as the size and the type of the virtual file.

Figure 3:
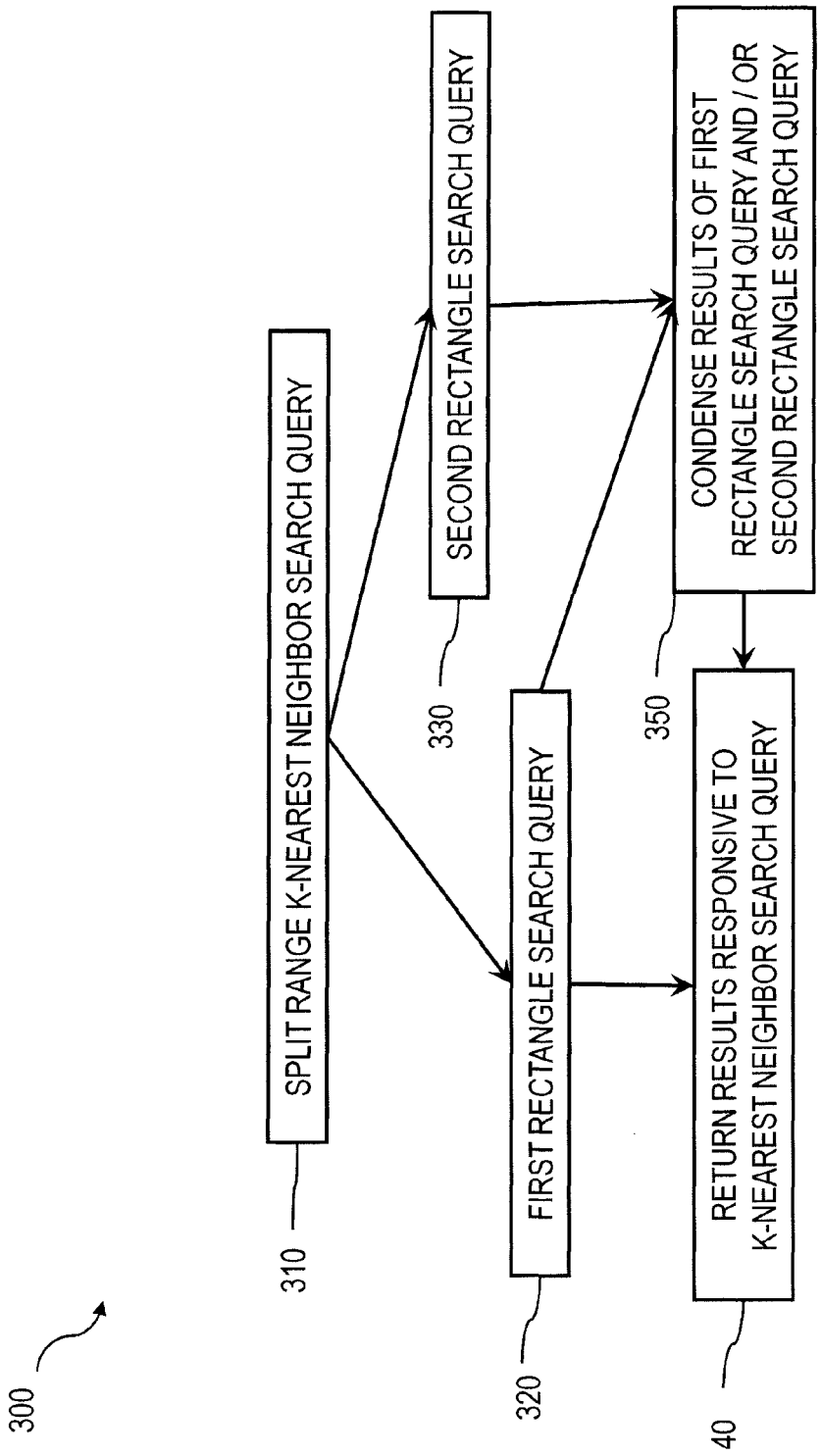
FIG. 3 is a first process flow diagram illustrating returning results of a range k-nearest neighbor query.

With reference to the process flow diagram 300 of FIG. 3, a range k-nearest neighbor search query 310 can be split into first and second rectangle search queries 320, 330. In good cases, only the first rectangle search query 320 needs to be performed and the range k-nearest neighbor query can be answered, at 340, based in these results. In bad cases, the second rectangle search query 330 can be required, however, this second query can be reduced to a delta query. Afterwards the result set can be condensed, at 350, by exploiting the way how the points are stored in a column oriented database before the distances are calculated. Combining these optimizations can provide significant performance gains even on very big data sets.

Figure 4:
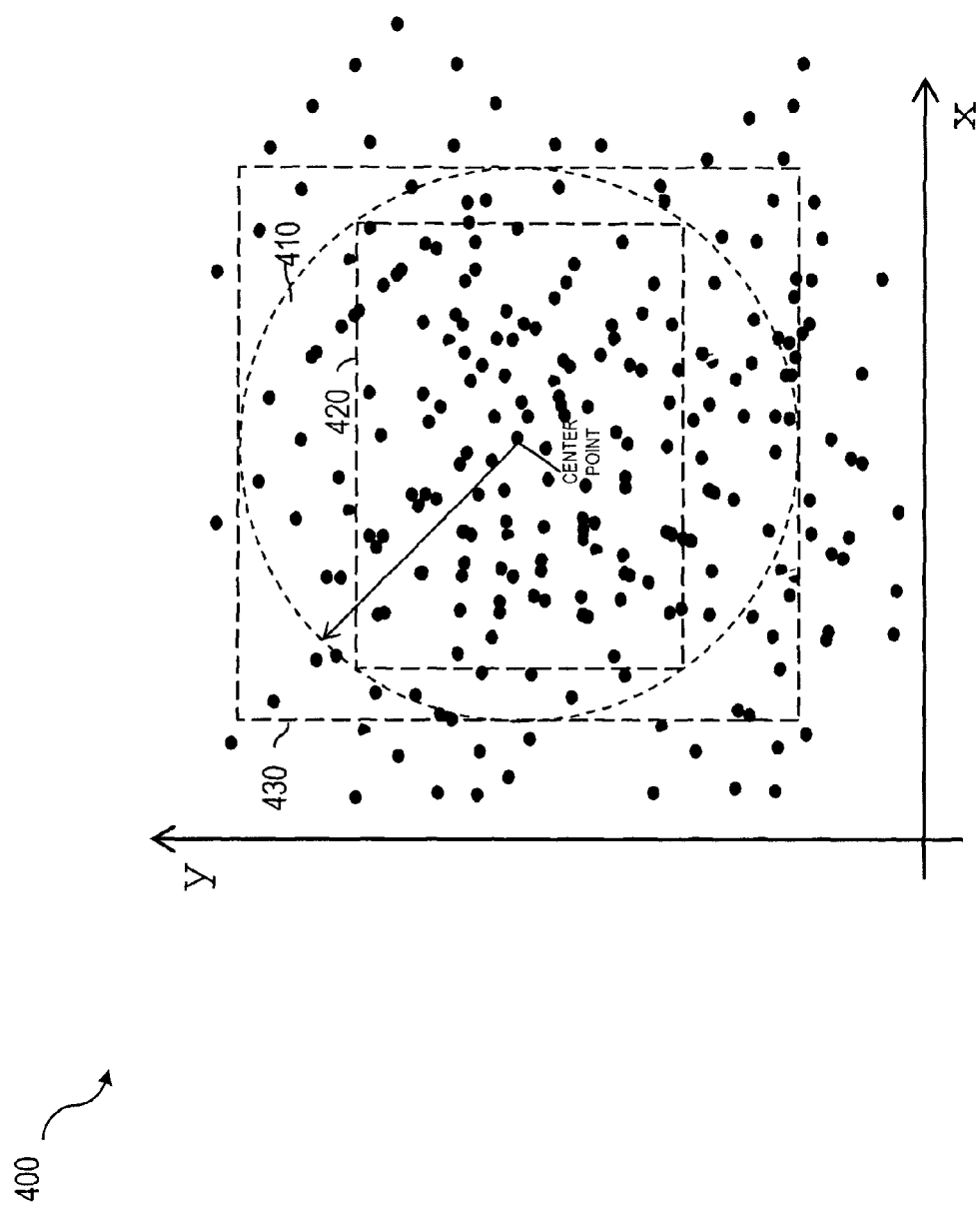
FIG. 4 is a diagram illustrating points with an inner rectangle and an maximum bounding rectangle in relation to a center point.
Figure 5:
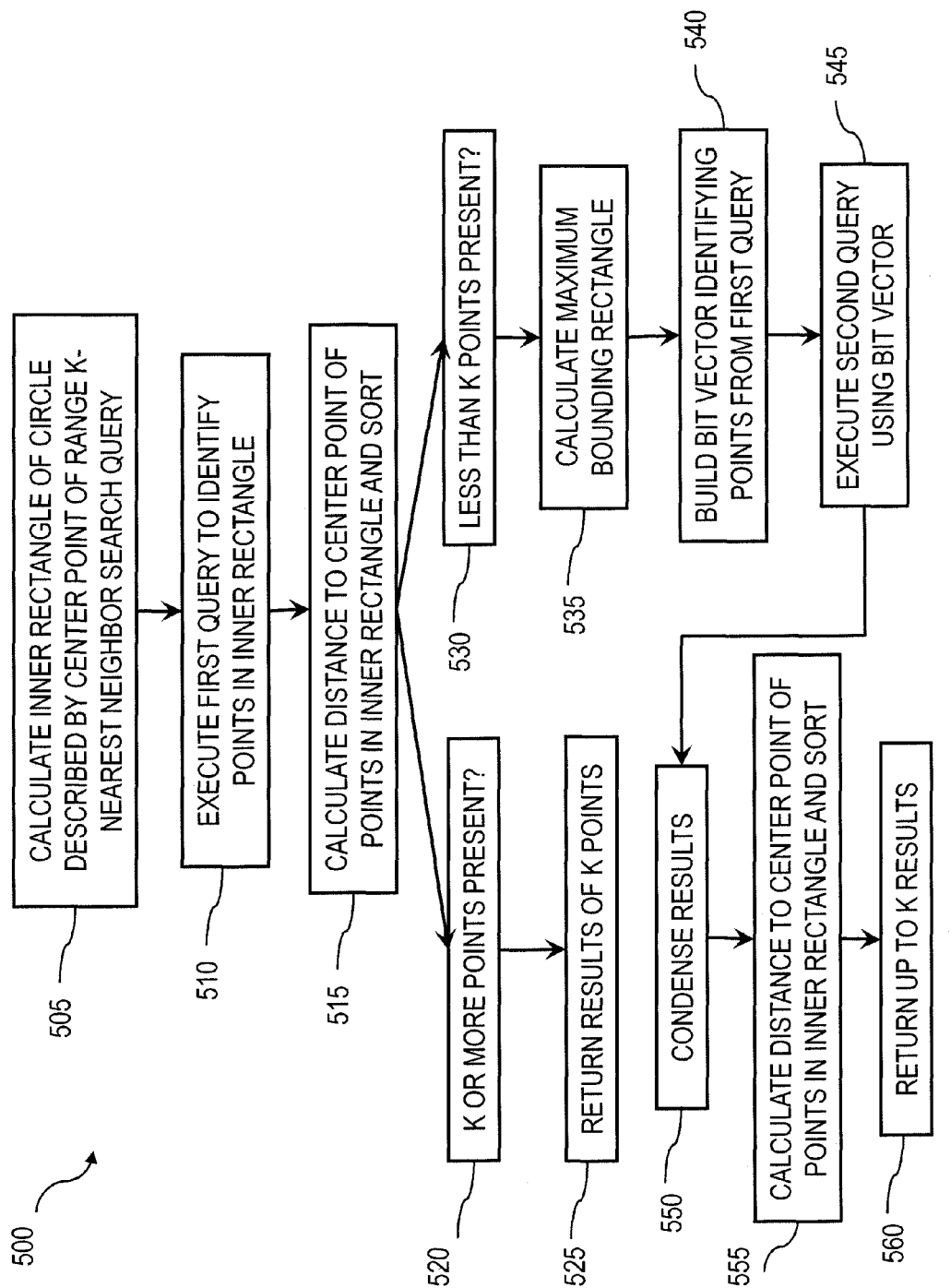
FIG. 5 is a second process flow diagram illustrating returning results of a range k-nearest neighbor query.

With reference to the diagram 400 of FIG. 4 and the process flow diagram 500 of FIG. 4, at 505, an inner rectangle (420) of a circle (410) that is described by a center point and a radius of a range k-nearest neighbor query is calculated. A first query is then executed at 510 that identifies results within the inner rectangle (420). For the points that are included in this inner rectangle (420), at 515, the distance to the center point is calculated and, at 530, the points are sorted by the distance. If k or more than k points are in that inner rectangle (420), at 520, the sorted list is cut after the k-th entry and returned, at 525, as query result. If less than k points, at 530, are in the inner rectangle (420), at 535, the maximum bounding rectangle (MBR) (430) including the whole circle (410) (described by the center point and the radius) is calculated.

From the first search query, a bit vector is built, at 540, that indicates the indexes of the points that are returned by the first query. The MBR (430) together with the bit vector are used for a second query which, at 545, will return all points that are inside the MBR (430) whereby all points are skipped by default that are marked in the bit vector [a 1 at an index position in the bit vector indicates that the point was retrieved by the first search query]. This speeds up the second query and reduces the number of results by avoiding duplicate results. For the resulting points, the distance to the center point is calculated and the list is sorted by this distance. Lets assume query one returns R1 results and R1 is less than k so E2=k−R1 results are missing. This means that the list of results of query two (R2) can be cut after the E2-th value and just appended to the result of query 1.

Furthermore the results from the MBR (430) search (the second query) can be condensed, at 550, before calculating the distances and sorting the results according to the distances (at 555). The result of the first rectangle search are two columns (X and Y) representing the points within the corresponding inner rectangle (420) plus an additional column holding the index of each result point in the corresponding base database table (that holds all points). The rectangle search itself is implemented in a base building block in a low-level part within the database. To further condense the result R2 before calculating the distances, the minimum and maximum X value can be computed that a point has so that the point is still in the radius around the center point which is $X_{min}=C_X-R$ and $X_{max}=C_X+R$. In a scan over all values (which is unexpensive from a resource point of view in a column oriented database) all points in R2 are marked as non-matching in a separate bit vector that have a greater X value than $X_{max}$ or a lower X value than $X_{min}$. Afterwards, only for the remaining points the distance to the center point has to be calculated and compared to the radius. This reduction of results of the second query can also be done on the Y column ($Y_{min}=C_Y-R$ resp. $Y_{max}=C_Y+R$). Thereafter, up to k results (based on the sorted distances) can be returned (at 560).

Aspects of the subject matter described herein can be embodied in systems, apparatus, methods, and/or articles depending on the desired configuration. In particular, various implementations of the subject matter described herein can be realized in digital electronic circuitry, integrated circuitry, specially designed application specific integrated circuits (ASICs), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. A client and server are generally, but not exclusively, remote from each other and typically interact through a communication network, although the components of the system can be interconnected by any form or medium of digital data communication. Examples of communication networks include, but are not limited to, a local area network ("LAN"), a wide area network ("WAN"), and the Internet. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail herein, other modifications or additions are possible. In particular, further features and/or variations can be provided in addition to those set forth herein. For example, the implementations described above can be directed to various combinations and sub-combinations of the disclosed features and/or combinations and sub-combinations of one or more features further to those disclosed herein. In addition, the logic flows depicted in the accompanying figures and/or described herein do not necessarily require the particular order shown, or sequential order, to achieve desirable results. The scope of the following claims may include other implementations or embodiments.

What is claimed is:

1. A method comprising:

receiving, by a database, a range k-nearest neighbor search query, the range k-nearest neighbor search query specifying a center point and a radius, the range k-nearest neighbor search query comprising a k value defining a number of requested points that define, by the database, an inner rectangle bounded within a circle having the radius around the center point specified by the range k-nearest neighbor search query, wherein each corner of the inner rectangle terminates at the circle;

calculating, by the database for each point within the inner rectangle, a distance to the center point; and determining, by the database, a number of points within the inner rectangle;

executing at least one additional query, by the database, when the number of points within the inner rectangle is less than the number of requested points, the at least one additional query based on a maximum bounding rectangle of the circle, wherein the maximum bounding rectangle is calculated based on the center point and the radius such that the maximum bounding rectangle includes and surrounds the circle, and wherein executing the at least one additional query comprises:

calculating the maximum bounding rectangle including the circle if there are less than the k value defined number of requested points in the inner rectangle;

executing a first query using the inner rectangle;

generating a bit vector that indicates indexes of all points in the first query;

generating and executing a second query using the maximum bounding rectangle and the bit vector, the bit vector being used to skip points retrieved by the first query; and returning results based on the first query and the second query.

2. A method as in claim 1, further comprising:

sorting each point according to their corresponding calculated distances, and wherein query results are presented according to the sorting.

3. A method as in claim 1, wherein a value of 1 at an index position in the bit vector indicates that the corresponding point was retrieved by the first query.

4. A method as in claim 3, further comprising:

sorting the results of the second query according to distance from the center point.

5. A method as in claim 1, wherein only those results from the second query that, in combination with the results from the first query, are equal to or less than the k value are returned.

6. A method as in claim 1, further comprising:

condensing results from the second query.

7. A method as in claim 6, wherein condensing the results comprises:

identifying minimal and maximal bounds relative to the center point;

generating a second bit vector that identifies points outside the minimal and maximal bounds; and accessing the second bit vector to determine a distance to the center point for only those points within the minimal and maximal bounds.

8. A method as in claim 1, wherein at least four portions of the maximum bounding rectangle intersect with at least four portions of the circle.

9. A method as in claim 1, wherein the maximum bounding rectangle is a square, and wherein each side of the maximum bounding rectangle is equal in length to a diameter of the circle.

10. A non-transitory computer program product storing instructions for processing a range k-nearest neighbor search query of a database which, when executed, result in operations comprising:
receiving, by a database, a range k-nearest neighbor search query, the range k-nearest neighbor search query specifying a center point and a radius, the range k-nearest neighbor search query comprising a k value defining a number of requested points that define, by the database, an inner rectangle bounded within a circle having the radius around the center point specified by the range k-nearest neighbor search query, wherein each corner of the inner rectangle terminate at the circle;
calculating, by the database for each point within the inner rectangle, a distance to the center point; and
determining, by the database, a number of points within the inner rectangle;
executing at least one additional query, by the database, when the number of points within the inner rectangle is less than the number of requested points, the at least one additional query based on a maximum bounding rectangle of the circle, wherein the maximum bounding rectangle is calculated based on the center point and the radius such that the maximum bounding rectangle includes and surrounds the circle, and wherein executing the at least one additional query comprises:
calculating the maximum bounding rectangle including the circle if there are less than the k value defined number of requested points in the inner rectangle;
executing a first query using the inner rectangle;
generating a bit vector that indicates indexes of all points in the first query;
generating and executing a second query using the maximum bounding rectangle and the bit vector, the bit vector being used to skip points retrieved by the first query; and
returning results based on the first query and the second query.

11. A computer program product as in claim 10, wherein the operations further comprise:
sorting each point according to their corresponding calculated distances, and
wherein query results are presented according to the sorting.

12. A computer program product as in claim 10, wherein a value of 1 at an index position in the bit vector indicates that the corresponding point was retrieved by the first query.

13. A computer program product as in claim 12, further comprising: sorting the results of the second query according to distance from the center point.

14. A computer program product as in claim 10, wherein only those results from the second query that, in combination with the results from the first query, are equal to or less than the k value are returned.

15. A computer program product as in claim 10, wherein the operations further comprise:
condensing results from one or more of the second query.

16. A computer program product as in claim 15, wherein condensing the results comprises:
identifying minimal and maximal bounds relative to the center point;
generating a second bit vector that identifies points outside the minimal and maximal bounds; and
accessing the second bit vector to determine a distance to the center point for only those points within the minimal and maximal bounds.

17. A system comprising:
at least one data processor;
memory storing instructions, which when executed, result in operations comprising:
receiving, by a database, a range k-nearest neighbor search query, the range k-nearest neighbor search query specifying a center point and a radius, the range k-nearest neighbor search query comprising a k value defining a number of requested points that define, by the database, an inner rectangle bounded within a circle having the radius around the center point specified by the range k-nearest neighbor search query, wherein each corner of the inner rectangle terminate at the circle;
calculating, by the database for each point within the inner rectangle, a distance to the center point; and
determining, by the database, a number of points within the inner rectangle;
executing at least one additional query, by the database, when the number of points within the inner rectangle is less than the number of requested points, the at least one additional query based on a maximum bounding rectangle of the circle, wherein the maximum bounding rectangle is calculated based on the center point and the radius such that the maximum bounding rectangle includes and surrounds the circle, and wherein executing the at least one additional query comprises:
calculating the maximum bounding rectangle including the circle if there are less than the k value defined number of requested points in the inner rectangle;
executing a first query using the inner rectangle;
generating a bit vector that indicates indexes of all points in the first query;
generating and executing a second query using the maximum bounding rectangle and the bit vector, the bit vector being used to skip points retrieved by the first query; and
returning results based on the first query and the second query.

18. A system as in claim 17, wherein the operations further comprise:
sorting each point according to their corresponding calculated distances,
wherein query results are presented according to the sorting.

19. A system as in claim 17, wherein the operations further comprise:
condensing results from the second query by:
identifying minimal and maximal bounds relative to the center point;
generating a second bit vector that identifies points outside the minimal and maximal bounds; and
accessing the second bit vector to determine a distance to the center point for only those points within the minimal and maximal bounds.

* * * * *